US012785939B2

(12) United States Patent
Michaelis

(10) Patent No.: US 12,785,939 B2
(45) Date of Patent: Nov. 3, 2026

(54) DISTRIBUTED LEDGER-BASED SYSTEM, METHOD AND APPARATUS FOR MANAGING TRUST RELATIONSHIPS

(71) Applicant: Beyond Aerospace, Ltd., Kelowna (CA)

(72) Inventor: Oliver Michaelis, San Diego, CA (US)

(73) Assignee: Beyond Aerospace Ltd., Kelowna (CA)

( * ) Notice: Subject to any disclaimer, the term of this patent is extended or adjusted under 35 U.S.C. 154(b) by 161 days.

(21) Appl. No.: 18/734,186

(22) Filed: Jun. 5, 2024

(65) Prior Publication Data

US 2025/0286704 A1 Sep. 11, 2025

Related U.S. Application Data

(60) Provisional application No. 63/563,877, filed on Mar. 11, 2024, provisional application No. 63/562,993, filed on Mar. 8, 2024.

(51) Int. Cl.

*H04L 29/06* (2006.01)
*H04L 9/08* (2006.01)
*H04L 9/32* (2006.01)

(52) U.S. Cl.

CPC .......... *H04L 9/0825* (2013.01); *H04L 9/3247* (2013.01); *H04L 9/3263* (2013.01)

(58) Field of Classification Search

CPC ... H04L 9/0825; H04L 9/3247; H04L 9/3263; H04L 9/006; H04L 9/50
See application file for complete search history.

(56) References Cited

U.S. PATENT DOCUMENTS 11,182,782 B2 * 11/2021 Wright ................. G06Q 20/223
11,245,691 B1 * 2/2022 Dods ................... H04L 63/0838
2010/0318788 A1 * 12/2010 Salvarani ............. H04L 9/3263 713/156
2018/0183768 A1 * 6/2018 Lobban ................. H04L 63/061
2018/0234496 A1 * 8/2018 Ratias ................. H04L 67/1095
2019/0081796 A1 * 3/2019 Chow ..................... G06Q 20/34
2019/0273617 A1 * 9/2019 Maher ................... H04L 9/0844
(Continued)

FOREIGN PATENT DOCUMENTS

CN 107682308 B * 12/2019 ......... H04L 63/0485
CN 114363162 A * 4/2022
(Continued)

*Primary Examiner* — Sher A Khan
(74) *Attorney, Agent, or Firm* — Thibault Patent Group

(57) ABSTRACT

A system, apparatus and method for managing trust relationships with legacy nodes in a network of ledger-capable nodes. A first trust relationship is created among a plurality of ledger-capable nodes in the form of a permissioned mission channel. A second trust relationship is created among some of the ledger-capable nodes of the mission channel in a permissioned candidate channel. One of the ledger-capable nodes of the mission channel is selected as a trust manager for the candidate channel. The selected ledger-capable node establishes a third trust relationship with a legacy node based on a common, root certificate authority, and then another ledger-capable node establishes a fourth trust relationship with the legacy node based on the first ledger-capable node acting as a proxy certificate authority for the root certificate authority.

12 Claims, 6 Drawing Sheets

(56) References Cited

U.S. PATENT DOCUMENTS

| | | | | |
|---|---|---|---|---|
| 2019/0306128 | A1 * | 10/2019 | Kothavale | H04L 9/50 |
| 2019/0342084 | A1 * | 11/2019 | Mehedy | H04L 9/0643 |
| 2020/0067708 | A1 * | 2/2020 | Subba | H04L 9/3226 |
| 2020/0084194 | A1 * | 3/2020 | McMurdie | H04L 9/0833 |
| 2021/0014065 | A1 * | 1/2021 | Gourisetti | H04L 9/0637 |
| 2021/0374693 | A1 * | 12/2021 | La Salle | G06Q 20/0655 |
| 2022/0029831 | A1 * | 1/2022 | Baek | G16Y 10/75 |
| 2022/0116231 | A1 * | 4/2022 | Choi | G06Q 10/0832 |
| 2022/0311597 | A1 * | 9/2022 | Goel | G06F 21/6209 |
| 2023/0081416 | A1 * | 3/2023 | Manevich | H04L 9/0869 |
| | | | | 713/156 |
| 2024/0113902 | A1 * | 4/2024 | Michaelis | H04L 9/50 |

FOREIGN PATENT DOCUMENTS

| | | | | | |
|---|---|---|---|---|---|
| CN | 115129785 | A | * | 9/2022 | G06F 21/602 |
| CN | 111953490 | B | * | 11/2023 | H04L 9/0866 |
| KR | 20200102262 | A | * | 8/2020 | H04L 9/3263 |
| WO | WO-2019105407 | A1 | * | 6/2019 | H04L 63/0869 |
| WO | WO-2020061593 | A1 | * | 3/2020 | H04L 63/0442 |
| WO | WO-2021105836 | A1 | * | 6/2021 | H04L 63/12 |
| WO | WO-2022214802 | A1 | * | 10/2022 | H04W 12/04 |

* cited by examiner

DISTRIBUTED LEDGER-BASED SYSTEM, METHOD AND APPARATUS FOR MANAGING TRUST RELATIONSHIPS

CROSS-REFERENCE TO RELATED APPLICATIONS

This application claims the benefit of U.S. provisional patent application 63/563,877 filed on Mar. 11, 2024 and U.S. provisional patent application 63/562,993 filed on Mar. 8, 2024.

BACKGROUND

Field of Use

The present invention relates to the field of distributed ledger technology and more specifically to a system, method and apparatus for using distributed ledger technology to manage trust relationships with legacy nodes.

Description of the Related Art

Blockchain technology has exploded into the mainstream recently, underlying the technology of cryptocurrencies. Blockchain technology utilizes encrypted, distributed, digital ledgers that describe digital transactions that occur between two or more entities over a wide-area network, such as the Internet. Multiple "nodes" in a blockchain network keep a copy of the distributed ledger, and when a digital transaction occurs, each verifier node in the network attempts to validate the transaction. When the transaction is validated by one of the validating nodes, it sends proof of the validation to the other nodes. Once a majority of the nodes agree that the proof is valid, the transaction is added to a plurality of other validated transactions, and a new "block" is written to the distributed ledger and updated on all of the nodes.

While blockchain technology is well-known, used as the technological backbone of digital cryptocurrencies, it may be used in other applications, such as a tool for trust management among a plurality of fixed and mobile assets or nodes.

For example, a permissioned, decentralized ledger (otherwise known as a "ledger channel" or simply "channel") may manage access to particular blocks created by the channel, as well as manage new transactions, via explicit memberships in the channel. Membership typically requires a consensus operation and may be memorialized on a membership channel. This provides for a very strong and resilient implementation to depict trust relationships in the form of membership in a common channel.

In a typical network topology, some nodes may not be capable of supporting the computational requirements needed to participate in a permissioned ledger channel or they may only be capable of authentication using, for example, Public Key Infrastructure (PKI) (i.e., the use of cryptographically-signed digital certificates). These nodes are referred to herein as "legacy nodes". Typically, legacy nodes must be provisioned well in advance of actual use and are essentially in a static trust configuration once they are deployed. Further, because these nodes are statically configured upon deployment, all other assets that may need to communicate with a legacy node must be identified at such time as well. Thus, the assignment of equipment (i.e., nodes, assets) to an operation utilizing this equipment (a "mission") today is very static and inflexible.

SUMMARY

The embodiments herein describe systems, methods and apparatus for managing trust relationships among ledger-capable nodes and non-ledger-capable legacy nodes. In one embodiment, a method is described, comprising enrolling, by a mission control center, a plurality of ledger-capable nodes in a permissioned mission channel of a distributed ledger network, including a first ledger-capable node and a second ledger-capable node, to form a first trust relationship among the plurality of ledger-capable nodes based on a membership in the permissioned distributed ledger channel, assigning the first ledger-capable node as a trust manager for a permissioned candidate channel of the distributed ledger network, enrolling, by the first ledger-capable node, the second ledger-capable node into the permissioned candidate channel to form a second trust relationship between the first ledger-capable node and the second ledger-capable node based on each node's membership in the permissioned candidate channel, establishing a third trust relationship between the first ledger-capable node and a first legacy node using public-key infrastructure, and establishing a fourth trust relationship between the second ledger-capable node and the first legacy node based on the second trust relationship between the first ledger-capable node and the first legacy node.

In another embodiment, a system is described, comprising a mission control center capable of enrolling a plurality of ledger-capable nodes in a permissioned mission channel of a distributed ledger network, including a first ledger-capable node and a second ledger-capable node, to form a first trust relationship among the plurality of ledger-capable nodes based on a membership in the permissioned distributed ledger channel, and capable of selecting the first ledger-capable node as a trust manager for a permissioned candidate channel of the distributed ledger network, the first ledger-capable node, capable of enrolling the second ledger-capable node in the permissioned candidate channel to form a second trust relationship between the first ledger-capable node and the second ledger-capable node based on each node's membership in the permissioned candidate channel, and a first legacy node, capable of establishing a third trust relationship with the first ledger-capable node using public-key infrastructure, and capable of establishing a fourth trust relationship with the second ledger-capable node based on the second trust relationship between the first ledger-capable node and the first legacy node.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein.

DETAILED DESCRIPTION

Figure 1:
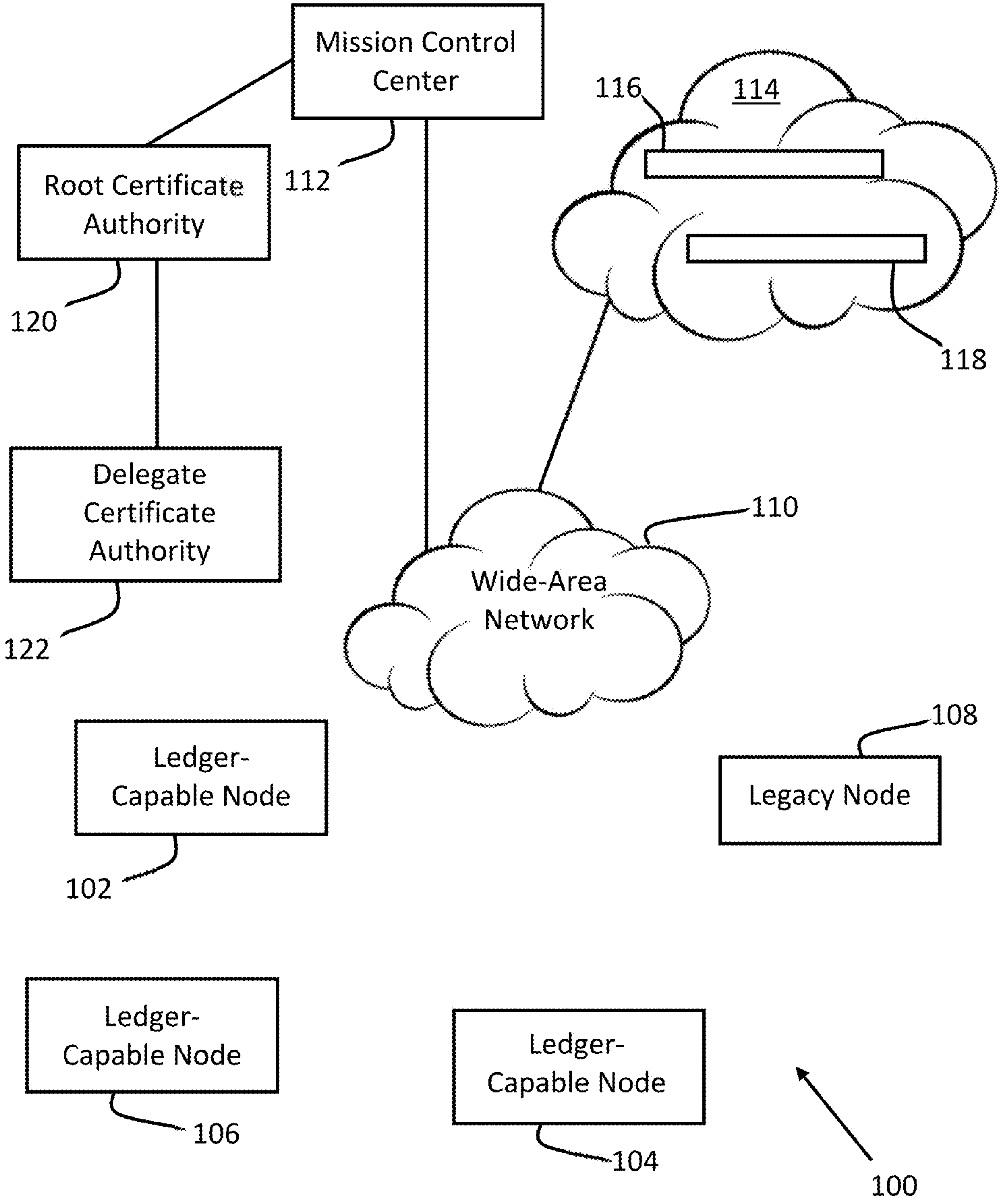
FIG. 1 is one embodiment of a system for managing trust relationships among ledger-capable nodes and legacy nodes.

The embodiments herein describe systems, methods and apparatus for managing trust relationships among ledger-capable assets/nodes and non-ledger-capable assets/nodes in a system. The system comprises physical "assets", such as an operations center, and one or more fixed or mobile "assets", such as computers, vehicles, mobile phones, ships, aircraft, unmanned airborne platforms ("UAVs"), etc. Each asset comprises communication circuitry to transmit and receive information to/from other assets, to the operations center and/or to one or more permissioned channels of a blockchain network. Such information may comprise command and control (C2) data as well as observational data, such location and telemetry information, audio and visual information, status information, etc. As used herein, an asset may be referred to as a "node", i.e., a device that is capable of creating, receiving, and/or sending information to other nodes in a network of nodes. The term "ledger-capable node", as used herein, comprises a node that is capable of communication with, and participating as a member of, one or more permissioned ledger channels of one or more distributed ledger networks. Ledger-capable nodes may establish trust relationships with other nodes that have been accepted as "member nodes" of a permissioned ledger channel, and may also establish trust relationships with other nodes that are not capable of participating in a permissioned ledger channel, herein referred to as "legacy nodes". Legacy nodes are generally not capable of communicating with, or participating as a member of, a permissioned ledger channel of a distributed ledger network, because they lack computational requirements needed to participate in a permissioned ledger channel or are only capable of authenticating using, for example, older technology, such as Public Key Infrastructure (PKI). Legacy nodes establish trust relationships with other legacy nodes and ledger-capable nodes via PKI protocols that utilize cryptographically-signed digital certificates, rather than being a member of a permissioned ledger channel.

Ledger-capable nodes are capable of transacting with a distributed ledger network, such as the well-known Hyperledger Fabric platform as one example. In particular, a ledger-capable node is able to submit distributed-ledger transactions to a distributed ledger network and authenticate itself to other ledger-capable nodes using a cryptographically-signed digital certificate and an associated private key. The Hyperledger Fabric platform is an open source blockchain framework hosted by The Linux Foundation. One of the features of the Hyperledger Fabric framework is that it allows for the creation of "permissioned channels", where only authorized nodes can participate in each channel. Membership in a permissioned channel may be governed by a selected, ledger-capable node referred to herein as a "trust manager", or Membership Service Provider (MSP), which issues cryptographically-signed digital certificates to ledger-capable nodes, allowing such nodes to authenticate themselves to other member nodes as members of a permissioned channel. Adding a node as a channel member may be triggered by an administrator or the MSP, or by events published on a distributed ledger network.

In order to extend trust management in a system of ledger-capable nodes to legacy nodes that are unable to participate in a permissioned distributed ledger channel, embodiments of the present invention provide for a system, apparatus and method that combines distributed ledger-based trust relationships (in the form of permissioned channel memberships) with traditional PKI-based trust relationships (i.e., using cryptographically-signed digital certificates). In some embodiments, this is implemented by provisioning a plurality of "operational certificates" from one or more certificate authorities ("CA's"), sometimes in the form of multiple certificate hierarchies, on such legacy nodes, and use ledger transactions to activate/deactivate these hierarchies using ledger-capable nodes. Instead of static PKIs as used today that need to be provisioned in advance to all potential nodes authenticating against a legacy node, the embodiments described herein allow setting up trust relationships for legacy nodes dynamically, after a mission begins, and for as late and for as short a duration as possible, i.e., just before communications with a legacy node is needed. Further, the embodiments described herein allow establishing trust relationships with ledger-capable nodes that were unknown at the time of deploying a legacy node.

FIG. 1 is a block diagram of one embodiment of a system 100 for managing trust relationships among ledger-capable nodes and legacy nodes. In this embodiment, system 100 comprises ledger-capable nodes 102, 104 and 106, legacy node 108, wide-area network 110, a mission control center 112, a distributed ledger network or platform 114, a root certificate (CA) authority 120 and in some embodiments, one or more "delegate" CAs 122 As part of distributed ledger network or platform 114, permissioned ledger mission channel 116 and permissioned ledger candidate channel 118 are conceptionally shown. Although system 100 is shown as comprising only three ledger-capable nodes and one legacy node, in practice, typically a large number of ledger-capable nodes and multiple legacy nodes are used. Each node may be configured for direct communication with other nodes and at least some of the nodes are capable of communicating directly with wide-area network 110. The ledger-capable nodes are configured to communicate with one or both permissioned mission channel 116 and permissioned candidate channel 118, typically via wide-area network 110. In practice, many of the nodes shown in FIG. 1 are mobile, such that each mobile node may, at times, be out of range of communications with other nodes, distributed ledger 114 and/or wide area network 110. The nodes may utilize a mesh-type communication protocol, which allows messages from one node to be communicated to a second node via a third node when the first node is out of range of communication from the second node. Mesh-type communications are well known in the art.

Wide-area network 110 comprises one or more communication networks, typically allowing communications over a wide geographic area. Such networks may comprise cellular, satellite, and/or a large, interconnected data network such as the Internet.

One example of system 100 comprises assets necessary to carry out a particular mission. For example, mission control center 112 may devise a mission to transport supplies to a foreign aid zone, such as a neighborhood where an earthquake has struck. The assets needed to complete this mission may comprise nodes 102-108, where node 102 may comprise a large ship stationed near an affected location, node 104 may comprise a helicopter, node 106 may comprise a second helicopter and node 108 comprises a pallet of aid equipped with a location device and a transceiver. In this example, the helicopters may fly in and out of range of each other, with the ship and the transceiver of the pallet.

Prior to commencement of a mission, mission control center 112 may identify the mission (such as to send aid to a foreign country, to carry out a reconnaissance mission, etc.), identify assets/nodes needed to carry out the mission, establish permissioned mission channel 116 on ledger network 114 and establish permissioned candidate channel 118, on ledger network 114 (or a different ledger network). Mission control center 112 typically defines one or more characteristics and/or capabilities for nodes to join each permissioned channel. Identification of each asset/node may comprise a unique identifier, such as a digital certificate signed by root CA 120, delegate CA 122 or mission control center 112 as a CA. Identification of each asset/node may alternatively comprise a digital object identifier, a decentralized identifier (DID), a serial number, a network address, or some other unique identifier.

Once assets/nodes are identified by mission control center 112 to participate in a mission, each such asset/node may be added to permissioned mission channel 116. Provisioning participating nodes as members of mission channel 116 is performed via an administrative function, which is executed e.g. by a mission coordinator associated with mission control center 112, or e.g. an automatic inventory system providing identifiers of equipment selected for a specific mission. A first, long-term trust relationship is formed between and among nodes that have been provisioned as members of permissioned mission channel 116 by virtue of their membership in permissioned mission channel 116, meaning that these member nodes are trusted by mission control center 112, and each other, to be who each node purports to be. The root CA is recognized by member nodes of permissioned mission channel 116 as a trust authority of the first trust relationship. "Long term" in this case means, generally, for a duration of the mission.

As part of pre-mission provisioning, mission control center 112 may also issue digital certificates to each ledger-capable node participating in the mission for authenticating the nodes when initiating communications with other nodes in system 100. In some cases, mission control center 112 may act as a CA, issuing cryptographically-signed certificates to nodes, sometimes in response to receiving a certificate signing request (CSR) from a node. In other embodiments, mission control center 112 may utilize two or more third-party CAs to issue certificates to nodes participating in the mission, such as root CA 120 and/or one or more delegate CAs 122. Each certificate typically comprises a public key and an identification of a node (such as a network address, a name, a DID, etc.), an identification of the CA who issued the certificate, and validity dates. In other embodiments, the issuing CA (i.e., either mission control center 112, root CA 120 or one of the delegate CA(s) 122), via mission control center 112, may provide certificates to nodes without a CSR request. In this case, a private cryptographic key corresponding to a public cryptographic key in a certificate is provided by mission control center 112, or by an issuing CA, to a node over a secure communication channel, such as a wired connection or other secure provisioning method.

In addition, in some embodiments, the issuing CA may provide its public cryptographic key, corresponding to its private key used to sign certificates, to one or more of the nodes in system 100, for the nodes to verify the digital signature of certificates used during authentication of nodes in system 100. In one embodiment, an issuing CA may provide a transaction to mission channel 116 in the form of a distributed-ledger transaction, publishing its public key for nodes having access to mission channel 116 to retrieve. The public key of the issuing CA can then be used by nodes to verify, or authenticate, certificates issued by the issuing CA, or its delegate CA(s), received from other nodes.

Prior to the start of a mission, mission control center 112 may select one or more nodes to act as a "trust manager", or membership service provider (MSP), for permissioned candidate channel 118 and, in this case, selects ledger-capable node 102. Generally, an MSP may be selected by mission control center 112 at any time during the mission and may be selected based on one or more factors, such as a location of a node, a node's ability to communicate with most or all of the assets in a mission, a node's ability to communicate with wide-area network 110, etc. As an MSP, node 102 is typically a member of candidate channel 118 and may be given the power to add and remove ledger-capable nodes to permissioned candidate channel 118 based on one or more criteria, such as if a ledger-capable node of mission channel 116 is in range and capable of communicating with one of the legacy nodes. A second trust relationship is formed between and among MSP node 102 and nodes that have been added as members of permissioned candidate channel 118 by virtue of their membership in permissioned candidate channel 118, meaning that each member node of permissioned candidate channel 118 trusts each other member node to be who each node purports to be. When a ledger-capable node is no longer able to communicate with a legacy node, or is predicted to soon be unable to communicate with it, or for some other reason, either determined by mission control center 112, MSP node 102 or by a ledger-capable node in communication (or not) of a legacy node, MSP node 102 may remove a node from permissioned candidate channel 118. Various algorithms may be applied by MSP node 102 to consider a mission channel 116 member a valid candidate channel 118 member, e.g. a distance to a legacy node, an operational status of a potential candidate node, a signal strength observed by a potential candidate node from a legacy node, and other metrics identifying a ledger node's capability to communicate with a legacy node. Such metrics may trigger a human administrator or automatic actions in system 100 to govern the current set of mission channel members that are also members of candidate channel 118. Only-ledger-capable nodes may be added to permissioned candidate channel 118, as legacy nodes do not have the capability to transact with the permissioned candidate channel 118. Unlike the first long term trust relationship among nodes of mission channel 116, the second trust relationship is typically relatively short-lived, i.e., typically on the order of seconds, minutes or a few hours, as candidate nodes are added and removed to/from permissioned candidate channel 118, based on their ability to communicate with certain legacy nodes, for example.

Also prior to the start of a mission, an issuing CA may provide one or more legacy nodes with one or more "unregistered", temporary operational certificates, each certificate cryptographically signed by a one of the CAs. These certificates are "unregistered" in the sense that the issuing CA is not known by any node in system 100 as a trusted CA (but operating under the same governance as mission control center 112 and hence trusted at the organizational level), and therefore the certificates cannot, yet, be used to verify the identity of a legacy node. Only after an unregistered operational certificate is counter-signed by MSP node 102 as a trusted node to a legacy node does it become a "registered" operational certificate, which can then be used to verify the identity of a legacy node, for temporary communications with a ledger-capable node as a member of candidate channel 118. This is explained in detail later herein.

Each temporary operational certificate may apply to a particular communication type or "trust proxy", i.e., one proxy/certificate used to forward C2 messages, another proxy/certificate to collect observational data from legacy node 108, etc. In other embodiments, each operational certificate does not have any communication type limitations, allowing any type of communications to occur. Each temporary operational certificate, after being counter-signed by MSP 102, is used to allow legacy node 108 to authenticate itself to a member of candidate channel 118, in this example, ledger-capable node 104, sometimes allowing communications for only short time periods, such as a few seconds, minutes, immediately after a communication has been completed, or when a temporary operational certificate has been compromised.

One of the temporary operational certificates is chosen by a legacy node when it is time to authenticate the legacy node with a ledger-capable node of candidate channel 118, as will be explained in greater detail later here. Each operational certificate is generally used on a temporary basis, i.e., over a limited time period or after the occurrence of a predetermined event, to allow temporary communications between legacy node 108 and a ledger-capable node, typically on the order of several seconds, minutes or hours. A limited time period may mean an expected time to complete a task, such as completing a communication between legacy node 108 and a candidate channel member, or it may mean until the occurrence of a predetermined event, such as an expected or unexpected termination of communications with legacy node 108, a certificate, public key or private key of a temporary operational certificate becoming compromised, receipt of a command from mission control center 112 to deactivate a particular temporary operational certificate, etc. If any temporary operational certificate signed by MSP node 102 becomes compromised, legacy node 108 can then select another temporary operational certificate for use.

Also prior to the start of the mission, mission control center 112 may provision one or more legacy nodes in system 100, as well as MSP node 102, with one or more "C2" digital certificates and an associated private cryptographic key, respectively, signed by an issuing CA's private key. C2 certificates are used to establish a third trust relationship in system 100, i.e., a trust relationship between an MSP node and a legacy node in order to transfer certain cryptographic keys and/or digital certificates between them, as will be discussed in greater detail later herein. In some embodiments, the issuing CA, or mission control center 112, publishes the one or more C2 digital certificates belonging to legacy node 108, or just a public key and an identification of an associated legacy node associated with the public key, on candidate channel 118, and MSP node 102 may retrieve the one or more C2 certificates or other information belonging to legacy node 108 by reading one of the cryptographic blocks published by candidate channel 118. In another embodiment, an issuing CA, or mission control center 112, may provide C2 certificates, plus a respective private key associated with each certificate, respectively, each to legacy node 108 and MSP node 102 via a secure channel, such as a wired connection in a secure provisioning facility.

After legacy node 108 has been provisioned with its C2 certificate and MSP node 102 provisioned with its C2 certificate, legacy node 108 and MSP node 102 mutually authenticate with each other by each node signing a random data value with the C2 private key and both nodes verifying the signature of each other using each other's respective public key. After mutual authentication, MSP node 102 generates a self-signed "ad-hoc" (AH) digital certificate and an associated AH private cryptographic key, signs the AH certificate with the C2 private key, and provides the AH certificate (containing an AH public cryptographic key associated with the AH private key) to legacy node 108. Legacy node 108 provides MSP node 102 with one of its temporary operational certificates, also signed by the C2 private key.

After MSP node 102 receives the selected, temporary operational certificate from legacy node 108, MSP node 102 cryptographically counter-signs the certificate with its AH private key to form a counter-signed digital certificate identifying a public key associated with the selected, temporary operational certificate, as well as establishing MSP node 102 as an alternative, ad-hoc or proxy, CA for the limited time that the selected, temporary operational certificate is in effect. In the role of an ad-hoc CA, MSP node 102 acts as a proxy certificate authority for mission control center 112, or another entity that issued the C2 certificates, such as root CA 120 or delegate CA(s) 122, enabling legacy node 108 to verify a certificate sent by a ledger-capable node using the AH public key provided by MSP node 102 to legacy node 108. The AH public key provided from MSP node 102 to legacy node 108 allows legacy node 108 to verify ledger-capable nodes, as will be described in detail later herein.

After a mission begins, legacy node 108 may be travelling to, or have travelled to, an assigned location from mission control center 112, but unable to communication with most of the nodes in system 100. For example, legacy node 108 may be out of range of most nodes, a number of ledger-capable nodes may be unable to communicate due to a denied communication environment, etc. MSP node 102 may actively monitor the ledger-capable nodes to determine which of the nodes are capable, or will soon be capable, of communicating with legacy node 108 via one or more observed metrics as described earlier herein. When MSP node 102 determines that a ledger-capable node is likely able to communicate with legacy node 108 and an insufficient number of ledger-capable nodes are currently members of candidate channel 118, able to communicate with legacy node 108 MSP node 102 may add one or more such ledger-capable nodes as members of candidate channel 118. In this example, node 104 is added to the candidate channel 118 when node 102 determines that node 104 is likely to be able to communicate with node 108. At that point, node 104 becomes a member of permissioned candidate channel 118.

At some later time, communications with legacy node 108 may be desired, either triggered by a command from mission control center 112, in some embodiments via permissioned mission channel 116, self-determined (such as if ledger-capable node 104 determines that legacy node 108 is off course or exhibits unexpected behavior), or by receiving a communication from legacy node 108, such as a "ping", a discovery message, etc. In any case, ledger-capable node 104 may generate a public-private cryptographic key pair, and send a CSR request to MSP node 102 via a secure communication method, e.g. a TLS-secured connection over an IP link, a secure wireless channel, etc., comprising the locally-generated public cryptographic key and an identifier of ledger-capable node 104, requesting that MSP node 102 provide ledger-capable node 104 with a digital certificate containing the public key and identifier signed by MSP node 102 as the issuing CA, i.e., by the AH private cryptographic key. In response, and because ledger-capable node 104 is a member of the candidate channel 118, MSP node 102 can quickly verify that ledger-capable node 104 is a trusted node, and generate an AH certificate signed by the AH private cryptographic key and send it to ledger-capable node 104. This process of generating the CSR request, verifying that ledger-capable node 104 is a member of permissioned candidate channel 118, generating the signed certificate and providing the certificate to ledger-capable node 104 takes place in a very short time period, such as under five seconds, for example, which is desirable since ledger-capable node 104 may be required to initiate communication with legacy node 108 with very short notice.

In addition to sending the newly-created AH-signed certificate to ledger-capable node 104, MSP node 102 sends the temporary operational certificate provided to MSP node 102 from legacy node 108, counter-signed with the AH private key of MSP node 102, i.e., a registered, temporary operational certificate identifying MSP node 102 as a trusted CA.

After ledger-capable node 104 receives the AH-signed certificate and the registered, temporary operational certificate from MSP node 102, it verifies the registered, temporary operational certificate using the public key of MSP node 102 in order to establish that MSP 102 counter-signed the registered, temporary operational certificate and, due to MSP node 102 being a member of candidate channel 118 along with ledger-capable node 104, that MSP node 102 is a trusted entity and extending the trust relationship to the selected operational certificate of legacy node 108.

Ledger-capable node 104 transmits the AH-signed certificate and some data (e.g. a nonce) signed by the AH private key to legacy node 108 to authenticate itself to legacy node 108. Legacy node 108 verifies the signature of the certificate by applying the AH public key to the signed nonce to verify that MSP node 102 actually signed the AH-signed certificate and, because MSP node 102 is already a trusted node from previously exchanging C2 certificates with MSP node 102, legacy node 108 can now extend its trust relationship to ledger-capable node 104. Upon successful verification, legacy node 108 has established that node 104 is a trusted node in system 100. This verification is part of a fourth trust relationship formed between ledger-capable node 104 and legacy node 108, based on the third trust relationship previously created between ledger-capable node 102 and legacy node 108. Verification of ledger-capable node 104 is based on public key infrastructure, i.e., the use of the AH-signed certificate signed by MSP node 102 acting as a temporary trust authority and proxy CA for root CA 120 or delegate CA 122.

Legacy node 108 typically must also authenticate to ledger-capable node 104 before data can be provided to ledger-capable node 104 (thus completing the fourth trust relationship). Legacy node 108 sends data, such as a nonce or other data from the legacy node destined for a node in system 100, to ledger-capable node 104, signed by a private key associated with the selected, temporary operational certificate that was previously sent to MSP node 102. When ledger-capable node 104 receives the message, it applies the public key associated with the selected, temporary operational certificate, as provided by MSP node 102 previously, in order to verify legacy node 108. Once verified, ledger-capable node 104 may provide the data to other legend-capable nodes via mission channel 116, or by secure, direct communications with another node(s).

In one embodiment, after ledger-capable node 104 verifies legacy node 108, the nodes may decide to use other keys (e.g. symmetric keys) as part of the authentication exchange, which can then be used to protect data sent between ledger-capable node 104 and legacy node 108.

In one embodiment, one or both nodes 104 and/or 108 may transmit a "nonce" (i.e., a secure random number) to "challenge" the other node to determine if the other node is actually who it claims to be. Nonces prevent replay attacks where somebody observed an authentication exchange and simply re-uses the messages. By randomizing the data used in the exchange, the sender of a signature can guarantee that it was in the possession of the private key at the time of sending, effectively preventing replay attacks of message exchanges observed by a third party during a previous exchange.

In some embodiments, in order to limit the exposure of a registered, temporary operational certificate and its associated cryptographic keys, the registered, temporary operational certificate and its associated cryptographic keys may be "deactivated" so that communications using the cryptographic keys associated with the registered, temporary operational certificate will no longer be possible. In one embodiment, the issuing CA assigns an expiration time, or expiration event, to one or more unregistered, temporary operational certificates. In another embodiment, MSP node 102 assigns an expiration time, or some other expiration event, to a temporary operational certificate during the registration process, i.e., signing an unregistered, temporary operational certificate with MSP node 102's AH private key, or upon receiving a CSR request from a ledger-capable node of candidate channel 118. In any case, once the expiration time is reached, or an event occurs, the registered, temporary operational certificate becomes invalid. The expiration time may be extremely short, in the order of seconds, minutes or hours, for example. In another embodiment the certificate may include a usage limitation, such as a maximum number of signatures to be generated with the associated private key pair to indicate certificate expiry. In another embodiment, once the useful life of legacy node 104 is completed, all of its operational certificates may become obsolete, either by mission control center 112 or MSP node 102 publishing a "termination transaction" on candidate channel 118 and/or mission channel 116 to tell ledger-capable nodes of the obsolescence, or MSP node 102 may remove some or all of the members of candidate channel 118 (i.e. candidate channel member nodes "forget" any valid operational certificates of legacy node 108). In yet another embodiment, membership in candidate channel 118 may be revoked by MSP node 102, because ledger-capable node 104 is no longer capable of communications with legacy node 108, or for some other reason.

Figure 2:
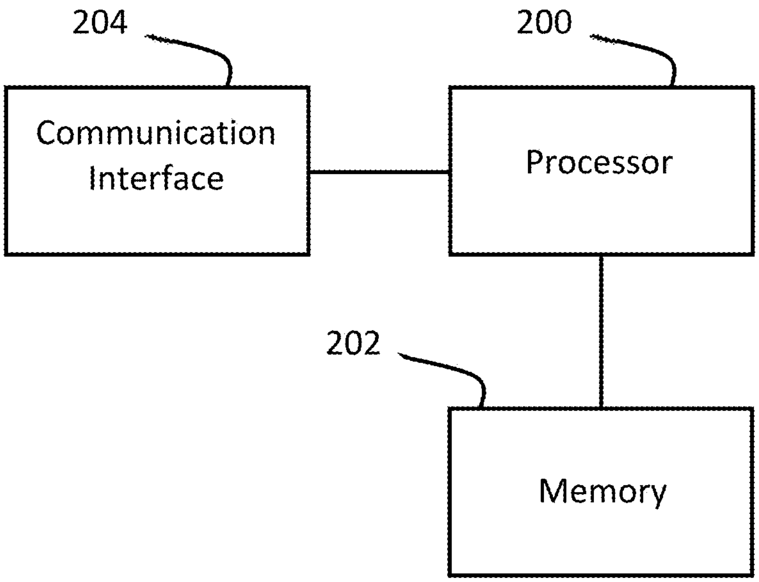
FIG. 2 is a functional block diagram of any of the nodes shown in FIG. 1.
Figure 3A:
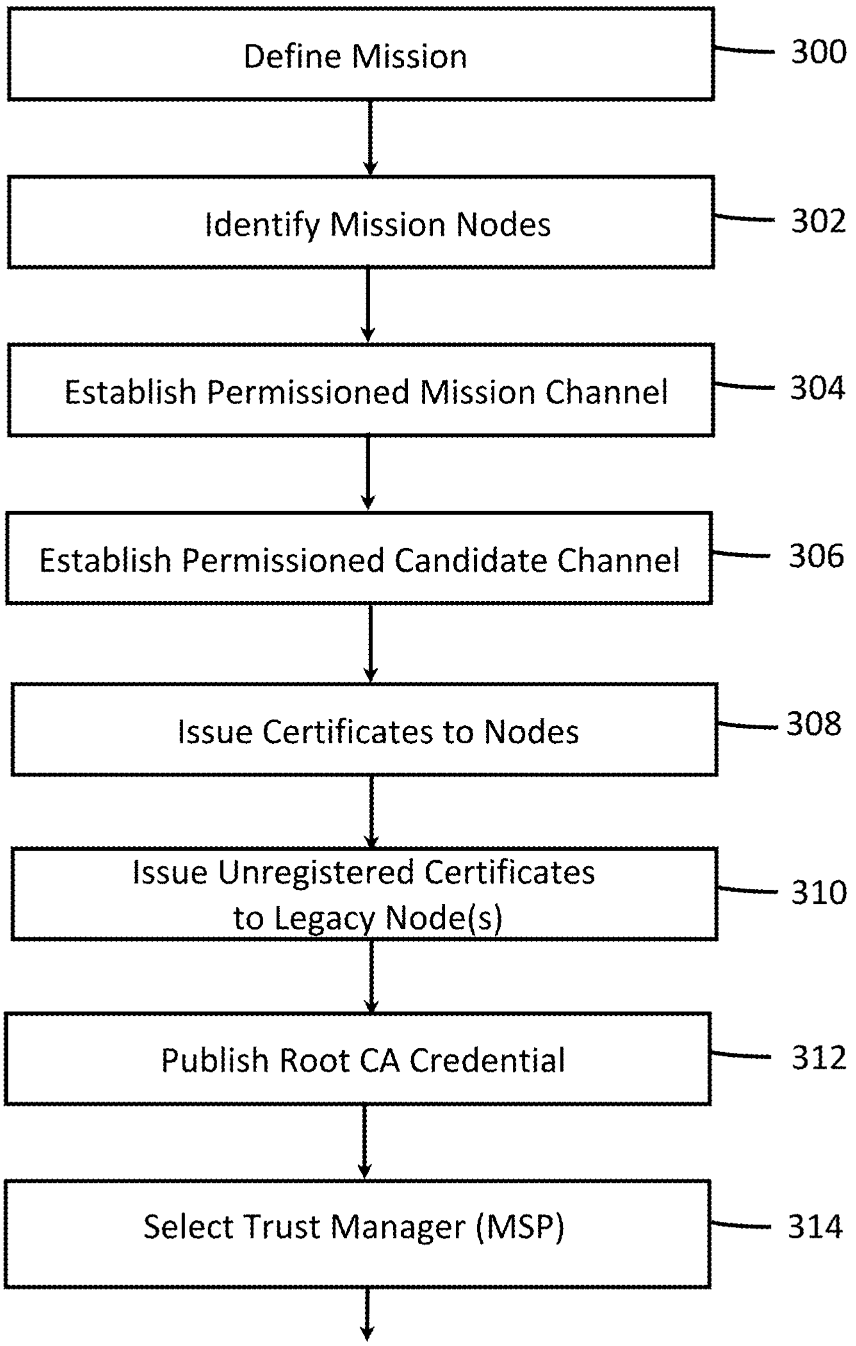
FIGS. 3A-3D represent a flow diagram illustrating one embodiment of a method, performed by the nodes of the system shown in FIG. 1, for managing trust relationships among the ledger-capable nodes and the legacy node shown in FIG. 1.
Figure 3B:
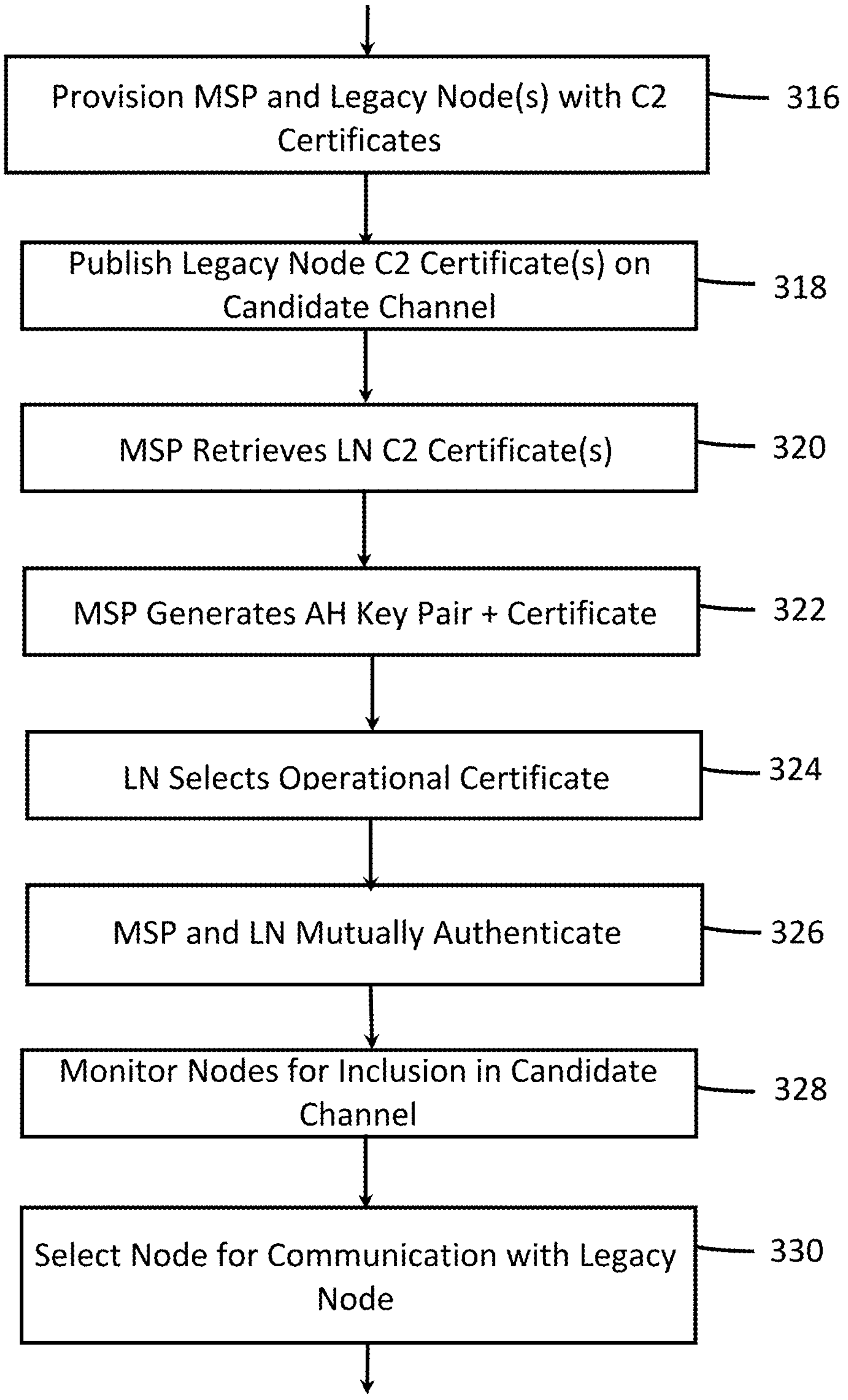
Figure 3C:
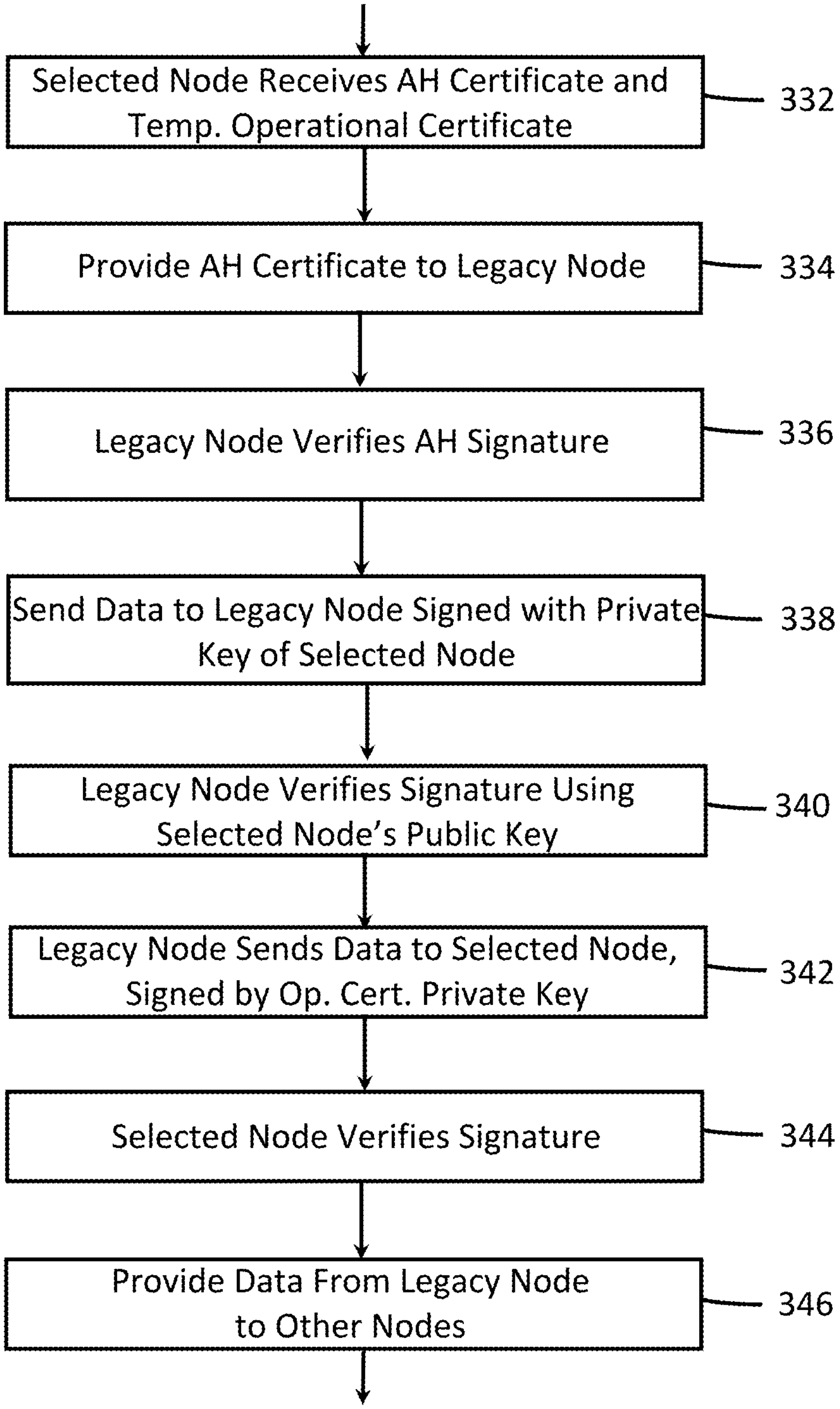
Figure 3D:
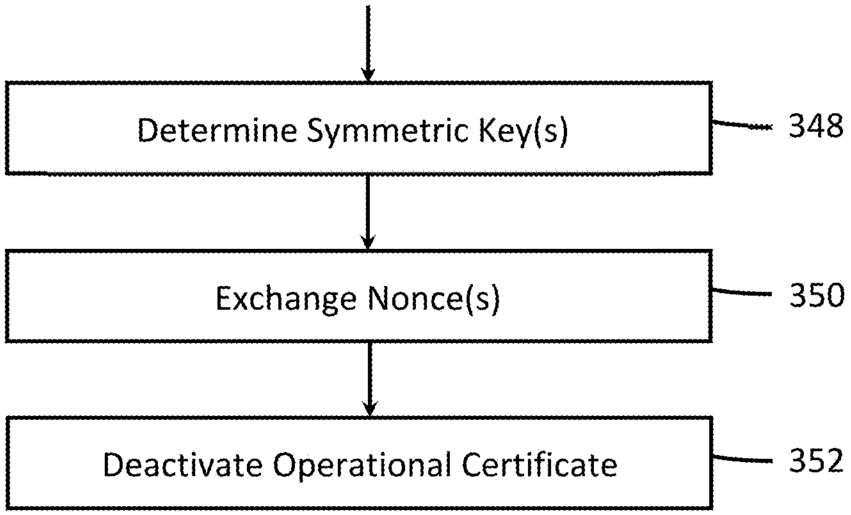

FIG. 2 is a simplified functional block diagram of any of the nodes shown in FIG. 1, comprising processor 200, memory 202, and communication interface 204.

Processor 200 is configured to provide general operation of each node by executing processor-executable instructions stored in memory 202, for example, executable computer code. Processor 200 typically comprises one or more general or specialized microprocessors, microcontrollers, and/or customized ASICs, selected based on computational speed, cost, power consumption, and other factors relevant to each node. When the processor-executable instructions are loaded into memory 202, processor 200 may become a specialized processor that performs an inventive method as described herein. Processor 200 may or may not be capable of performing processing operations required to participate in a distributed ledger channel, such as mission channel 116 or candidate channel 118. Generally, processor 200 of ledger-capable nodes in system 100 is able to perform such operations while processor 200 of legacy node 108 is not able to perform these operations.

Memory 202 is coupled to processor 200 and comprises one or more non-transitory information storage devices, such as static and/or dynamic RAM, ROM, flash memory, or some other type of electronic, optical, or mechanical memory device. Memory 202 is used to store processor-executable instructions for operation of each node, respectively. It should be understood that in some embodiments, a portion of information storage device 202 may be embedded into processor 200 and, further, that information storage device 202 excludes propagating signals.

Communication interface 204 is coupled to processor 200, comprising circuitry for sending and receiving information to/from other nodes in system 100, either directly, via other nodes and/or via wide-area network 110. Communication interface 204 may comprise wireless circuitry for wirelessly sending and receiving information. In other embodiments, for example where a node is stationary, such as when a node comprises a desktop computer, communication interface 204 may comprise a wired interface, comprising, for example, an ethernet port, USB port, wired or wireless LAN circuitry, etc. Communication interface 204 may be configured to transmit information great distances, such as when a node comprises a mobile asset, such as a ship, aircraft, UAV, etc. in these cases, communication interface 204 may comprise long-range wireless circuitry, such as cellular or satellite circuitry. All of the above circuitry is well-known in the art.

FIGS. 3A-3D is a flow chart illustrating one embodiment of a method, performed by three or more nodes of system 100, for managing trust relationships between legacy nodes and ledger-capable nodes. More specifically, the method describes operations performed by a processor 200 in each node, each executing processor-executable instructions stored in a respective memory 202, even though processor 200, memory 202 and communication interface 204 are not explicitly mentioned It should be understood that in some embodiments, not all of the steps shown in FIG. 3 are performed, and that the order in which the steps are carried out may be different in other embodiments. It should be further understood that some minor method steps have been omitted for purposes of clarity.

At step 300, operators of mission control center 112 may devise a particular mission that will involve a plurality of ledger-capable nodes and at least one legacy node 108. Planning the mission involves determining a number of nodes, node types, asset types, locations, personnel, etc.

At step 302, the operators of mission control center 112 may select nodes that will be used in the mission. As an example, and as shown in FIG. 1, ledger-capable nodes 102, 104 and 106, and legacy node 108, are chosen for the mission.

At step 304, mission control center 112 establishes a permissioned mission channel 116 on distributed ledger platform 114, and adds the selected ledger-capable nodes as trusted members of mission channel 116. In general, only ledger-capable nodes that have been pre-vetted and are deemed necessary by mission control center 112 are allowed to join mission channel 116. However, in some embodiments, ledger-capable nodes may autonomously join mission channel 116 if they meet certain requirements of mission channel 116, such as having one or more particular capabilities (such as an ability to communicate over hundreds of miles, and ability to capture video or audio information, being located in a particular location, etc.), having a certain identification predetermined by mission control center 112, having certain credentials, etc.). As a member of mission channel 116, any ledger-capable node may communicate with other ledger-capable member nodes of mission channel 116 by first authenticating itself as a member of mission channel 116, using digital certificates issued by MSP node 102. Mission channel 116 defines a trust relationship among its members by virtue of their inclusion into mission channel 116, and because each node's certificate has been verified as having been issued by MSP node 102.

At step 306, mission control center 112 establishes a permissioned candidate channel 118 on distributed ledger platform 114. Candidate channel 118 is used to identify ledger-capable nodes that are "candidates" to perform one or more particular functions, such as to communication with one or more legacy nodes of the mission.

At step 308, mission control center 112, root CA 120 or delegate CA 122, may issue cryptographically-signed digital certificates to the nodes participating in the mission, signed by the issuing CA. For the remainder of this disclosure, reference to either mission control center 112, root CA 120 or delegate 122, may be referenced simply as "the issuing CA". The certificates are used for authenticating the nodes when initiating communications to other nodes in system 100. In some cases, a digital certificate is created in response to receiving a certificate signing request (CSR) from a node, while in other cases, the issuing CA may create a public/private cryptographic key pair and then create a digital certificate based on an identity of a particular node that will receive the certificate, the public cryptographic key, and an identification of the issuing CA, i.e., The resulting certificate and public/private key may then be provided to the particular node, typically over a secure communication channel, such as a USB cable or some other means. It should be understood that the issuing CA may delegate certificate issuance to an intermediate CA as well-known in the art. The term root CA refers to any such hierarchical combination of CA entities that all operate under the same governance as mission control center 112.

At step 310, the issuing CA may generate and provide one or more unregistered, temporary operational certificates to one or more legacy nodes 108. As described previously, each of these certificates is signed by a private key of the issuing CA, however the certificates cannot be used to verify nodes in system 100 until an unregistered certificate is cryptographically counter-signed by MSP node 102, acting as a proxy CA for the issuing CA. The unregistered, temporary operational certificates are used one at a time, for providing temporary communications between legacy node 108 and ledger-capable node 104 as a member of candidate channel 118.

At step 312, mission control center 112 may provide the public cryptographic key or the root CA certificate to one or more of the nodes participating in the mission. In one embodiment, this is accomplished by causing a blockchain transaction to be published on mission channel 116. This allows ledger-capable nodes to retrieve the public cryptographic key/certificate for nodes to authenticate other nodes during the mission, i.e., verify that digital certificates were signed by a private key belonging to issuing CA. In some embodiments, issuing CA may issue several public/private keys and certificates over time, and some or all of these public keys or certificates may be distributed to other ledger-capable nodes as needed.

At step 314, mission control center 112 may select one or more nodes to act as a trust manager, or membership service provider (MSP), for permissioned candidate channel 118 and, in this case, selects node 102. As MSP, node 102 becomes a member of candidate channel 118. Generally, an MSP may be selected by mission control center 112 at any time during the mission and may be selected based on one or more factors, such as a location of a node, a node's ability to communicate with most or all of the assets in a mission, a node's ability to communicate with wide-area network 110, etc. As an MSP, node 102 may have an exclusive authority to add ledger-capable nodes participating in the mission to permissioned candidate channel 118 when it is determined that a ledger-capable node is, or may soon become, in range and capable of communicating with legacy node 108. In some embodiments, two or more ledger-capable nodes may be designated as MSPs for candidate channel 118 for redundancy. A trust relationship is formed between and among nodes that have been provisioned as members of permissioned candidate channel 118, including MSP node 102, by virtue of their membership in candidate channel 118. When a node is no longer in range of a legacy node and no longer able to communicate with it, MSP node 102 may remove the node from permissioned candidate channel 118. An MSP may decide to add or remove a ledger-capable node to candidate channel 118 based on a number of criteria such as connectivity and location metrics of a node. The decision may be triggered by automated algorithms running on MSP node 102, determining a ledger-capable node's eligibility to perform as a member of candidate channel 118, or manually by an administrator of mission control center 112 based on mission requirements. Only ledger-capable nodes may be added to permissioned candidate channel 118, as legacy nodes do not have the capability to transact with the permissioned candidate channel 118.

At step 316, an issuing CA, typically via mission control center 112, may provision one or more legacy nodes participating in the mission, as well as MSP node 102, with one or more "C2" digital certificates and a private key associated with each certificate, respectively. C2 certificates are used by MSP node 102 and legacy node 108 to establish a trust relationship between themselves, i.e., to authenticate themselves to each other using each's C2 certificate, in order to transfer certain cryptographic keys and/or digital certificates between them, as will be discussed in greater detail later herein. Each certificate is cryptographically signed with the private key of the issuing CA. Each C2 certificate comprises an identification of the node receiving a certificate, a public cryptographic key and an identification of the issuing CA.

Mission control center 112 may provide the C2 certificate (s) (either locally generated or received from issuing CA) plus respective private key(s) associated with each certificate to legacy node 108 and/or MSP node 102 via a secure channel, such as a secure link in a provisioning facility. In another embodiment, one or both of legacy node 108 and MSP node 102 may create a respective private/public key pair and provide a respective public key to the issuing CA in a CSR request. In response, the issuing CA creates a C2 digital certificate for a requesting node, signed by the private key of the issuing CA, and provides a respective certificate to the requesting node, signed by the issuing CA.

At step 318, mission control center 112 may publish the one or more C2 digital certificates belonging to legacy node 108, or just a public key together with an identification of legacy node 108 associated with each certificate, on candidate channel 118 in the form of a cryptographic block to establish legacy node 108 as a member of the trust realm constituted by candidate channel 118, even though legacy node 108 itself is not a member of candidate channel 118.

At step 320, MSP node 102 may retrieve the one or more C2 certificates or public keys/identification of legacy node 108 by reading one of the published cryptographic blocks published on candidate channel 118.

At step 322, MSP node 102 may generate an "ad-hoc" (AH) public and private cryptographic key pair, and also may generate a self-signed "ad-hoc" (AH) digital certificate (i.e., signed with the AH private key). This step is performed to prepare MSP node 102 to assume a role as an "ad-hoc", or proxy, CA, i.e., a CA for authenticating ledger-capable nodes to legacy node 108 prior to data exchanges. The AH public key and certificate may be published on candidate channel 118 in a cryptographic block as a trust reference to all current members of candidate channel 118. Thus, MSP node 102 assumes the role of the ad-hoc CA for the trust realm constituted by candidate channel 118.

At step 324, legacy node 108 may select one of its temporary operational certificates for use in authenticating itself to one of the candidate channel members prior to communications with one of such members. A public cryptographic key and a corresponding private cryptographic key are associated with the selected, temporary operational certificate, stored on legacy node 108.

At step 326, after legacy node 108 and MSP node 102 have been provisioned with their respective C2 certificates and associated private keys, legacy node 108 and MSP node 102 mutually authenticate with each other using their respective C2 certificates, typically just before the start of the mission, e.g. upon the launch of a UAV, or dispatch of a vehicle as part of a mission task. MSP node 102 countersigns the self-signed AH certificate with the private cryptographic key associated with the C2 certificate previously provided by the issuing CA. MSP node 102 sends the counter-signed AH self-signed certificate (containing the AH public cryptographic key) to legacy node 108, and legacy node 108 verifies the counter-signature as valid using the C2 public key received from the issuing CA previously, thus recognizing the AH self-signed certificate as a trusted entity. Legacy node 108 then stores the AH public key in memory 202 for use later in authenticating ledger-capable nodes of candidate channel 118.

As part of the process for authenticating legacy node 108 to MSP node 102, legacy node 108 sends the selected, unregistered, temporary operational certificate to MSP node 102, counter-signed with the private cryptographic key associated with the C2 certificate received previously by legacy node 108 from the issuing CA. When MSP node 102 receives the selected, unregistered, temporary operational certificate from legacy node 108, MSP node 102 verifies legacy 108's C2 counter-signature by applying the C2 public key to the counter-signature over the temporary operational certificate. Upon verification, MSP node 102 cryptographically counter-signs the temporary operational certificate with the AH private key to form a registered, temporary operational certificate, signed by the AH private key, identifying MSP node 102 as the CA. Thus, MSP node 102 hereon acts as a temporary proxy certificate authority (i.e., as long as the registered operational certificate is valid) for the issuing CA, as legacy node 108 knows that the issuing CA is trusted (from receiving the C2 certificate from the issuing CA earlier) and that MSP node 102 is trusted because MSP node 102 was verified using the C2 public key, also provided by the issuing CA.

At this point, MSP node 102 and legacy node 108 have mutually authenticated themselves to each other. Legacy node 108 recognizes the AH public key of MSP node 102 as a valid CA for certificates issued to ledger-capable nodes associated with the mission, while MSP node 102 possesses a registered, temporary operational certificate counter-signed by the AH private key and allowing MSP 102 to be recognized as a trusted proxy CA. At this point, multiple trust relationships have been established among a) ledger-capable nodes as members of permissioned mission channel 116, b) ledger-capable nodes as members of permissioned candidate channel 118, and c) between MSP node 102 and legacy node 108. In one embodiment, MSP node 102 may send the registered, temporary operational certificate to candidate channel 118 as a transaction, and candidate channel 118 may generate a cryptographic block containing the registered, temporary operational certificate, identifying legacy node 108 as a trusted node and also the public key associated with the registered, temporary operational certificate. Publishing the registered, temporary operational certificate allows any member of candidate channel 118 to retrieve the registered, temporary operational certificate and associated public key to validate legacy node 108 prior to a communication with legacy node 108.

At step 328, after a mission begins, MSP node 102 may monitor the ledger-capable nodes identified in mission channel 116 to determine which of the nodes are capable of, or will soon be capable of, communicating with legacy node 108. The capability to communicate with a legacy node may constitute the ability to exchange information, e.g. over a wireless link, and may also include a ledger-capable node's authorization status for communicating with legacy node 108. Legacy node 108 may be travelling, or have travelled, to an assigned location from mission control center 112, but unable to communicate with most of the ledger-capable nodes participating in the mission. For example, legacy node 108 may be out of range of most nodes, a number of ledger-capable nodes may be unable to communicate due to operation in a denied environment, etc. In this example, legacy node 108 is only capable of communicating with ledger-capable node 104. When MSP node 102 determines that a ledger-capable node is able to communicate with legacy node 108, MSP node 102 may add the node as a member of candidate channel 118. In one embodiment, MSP node 102 sends a transaction to candidate channel 118, memorializing node 104's membership status. In this example, node 104 is added to the candidate channel 118 when node 102 determines that node 104 is, or may, be able to communicate with legacy node 108. Adding node 104 to candidate channel 118 before communications are needed with legacy node 108 is important, in order to quickly authenticate legacy node 108 to node 104 when communications are later desired upon short notice. When node 104 is added to candidate channel 118, a trust relationship is established among node 104, any other nodes as a member of candidate channel 118 and MSP node 102, all as members of permissioned candidate channel 118. This trust relationship is the basis for MSP node 102 being able to promptly process a certificate signing request and issue an AH certificate to node 104 when node 104 needs to authenticate itself to legacy node 108.

At step 330, at some point during the mission, communications between legacy node 108 and mission control center 112 may be desired, based on events specific to the mission profile indicating a need to exchange information. For example, mission control center 112 may want to provide C2 data to legacy node 108, such as a command to alter the desired destination, a command to abort the mission, a command to activate certain features of legacy node 108, etc. Legacy node 108 may determine that communications with legacy node 108 are desired, such as when node 104 receives an (unauthenticated) discovery or "ping" message from legacy node 108 when legacy node 108 has recorded important visual or audio information, when node 104 realizes that it is able to connect to legacy node 108, when node 104 recognizes proximity to legacy node 108 via visual, radar, or other means, when node 104 is triggered by an mission control center 112, etc. In response to determining that communications should be established with legacy node 108, in one embodiment, ledger-capable node 104 may generate and send a CSR request to node 102, comprising a previously-generated public cryptographic key and an identity of ledger-capable node 104, requesting that MSP node 102 generate and provide to ledger-capable node 104 a digital certificate signed by MSP node 102, i.e., by the AH private cryptographic key. In response, and because ledger-capable node 104 is a member of the candidate channel 118, MSP node 102 can quickly verify that ledger-capable node 104 is a trusted node, and generate an AH certificate signed by the AH private cryptographic key and send it to ledger-capable node 104. This process of generating the CSR request, verifying that ledger-capable node 104 is a member of permissioned candidate channel 118, generating the signed certificate and providing the certificate to ledger-capable node 104 takes place in a very short time period, such as under five seconds, for example, which is desirable since ledger-capable node 104 may need to communicate with legacy node 108 on very short notice.

In another embodiment, MSP node 102 may determine that communications should be established with legacy node 108. For example, MSP node 102 may receive information about legacy node 108 from node 104, another member node of candidate channel 118, or from mission control center 112 (i.e., legacy node 108's position, heading, speed, etc.) and may then identify one of the member nodes of candidate channel 118 most likely to achieve connectivity with legacy node 108. In another example, MSP node 102 may receive transmissions from two or more member nodes of candidate channel 118, requesting communications with legacy node 108, and decide which node to select based on one or more factors, such as the first node to transmit the request, a signal strength between a requesting node and legacy node 108, an authorization status or security level of node 104, an estimated time when a requesting node will be in communication range of legacy node 108, etc. In any case, MSP node 102 may select node 104 to communicate with legacy node 108.

In another embodiment MSP node 102 may determine which ledger-capable member of candidate channel 118 should initiate a connection to legacy node 108 based on the type of data to be exchanged with legacy node 108. For example, if multiple ledger-capable nodes are each a member of candidate channel 118, and each has the ability to communicate with legacy node 108, then MSP node 102 may use a classification level associated with each member node to select a node for communication with legacy node 108. For example, if secure communications with legacy node 108 are required for a particular communication, MSP node 102 may select a member node having a security level equal or exceeding a security level associated with the communication and, in some embodiments, having the best communication connection with legacy node 108. The security level of any node may be defined by mission control center 112 based on a mission profile assigned to each node, or be dynamically determined by MSP node 102 based on an operational state of a candidate node (e.g. it's location or observability).

In addition to sending the AH certificate to ledger-capable node 104, MSP node 102 sends the registered, temporary operational certificate (selected previously by legacy node 108), counter-signed with the AH private key of MSP node 102.

At step 332, ledger-capable node 104 receives the signed digital certificate and the registered, temporary operational certificate from MSP node 102, and then verifies the counter-signed registered, operational certificate using the AH public key of MSP node 102, which node 104 may retrieve from a corresponding cryptographic block on candidate channel 118. Now node 104 possesses a digital certificate and recognized by legacy node 108 as a valid authentication credential, as well as the AH-counter-signed, temporary operational certificate, including the public key associated with this certificate, allowing node 104 to verify legacy node 108.

At step 334, ledger-capable node 104 transmits the digital certificate, signed by the AH private key of MSP node 102, to legacy node 108 to authenticate itself to legacy node 108.

At step 336, legacy node 108 receives the digital certificate and verifies the signature of the certificate by applying the AH public key belonging to MSP node 102 that was received from MSP node 102 during their earlier, mutual authentication. Upon successful verification, legacy node 108 possesses node 104's public key and recognizes node 104 as a trusted node in the scope of the mission.

At step 338, ledger-capable node 104 may transmit data to legacy node 108 after being verified as a trusted source to legacy 108. The data is signed with the private key of node 104, the data comprising C2 data or some other information related to the mission.

At step 340, legacy node 108 receives the data and verifies the signature by applying node 104's public key. After verification, legacy node 108 may use the data in the message for purposes of continuing its role in the mission.

At step 342, legacy node 108 may authenticate itself to ledger-capable node 104 for purposes of sending data to ledger-capable node 104. Legacy node 108 may send a nonce, or a message comprising mission data, e.g. status information, telemetry, or other observational data, to ledger-capable node 104, signed by a private key associated with the selected temporary operational certificate that was previously sent to MSP node 102.

At step 344, ledger-capable node 104 receives the message, and applies the public key associated with the selected, temporary operational certificate, as provided by MSP node 102 previously, in order to verify that the signature belongs to a trusted entity, i.e., MSP node 102 in this case.

At step 346, once legacy node 108 has been verified establishing a trust relationship with ledger-capable node 104, ledger-capable node 104 may provide the data received from legacy node 108 to other ledger-capable nodes or mission control center 112 via mission channel 116, or by secure, direct communications with another node(s) or wide-area network 110.

At step 348, in one embodiment, after legacy node 108 has been verified the nodes may decide to use other cryptographic keys (e.g. symmetric keys) that can then be used to encrypt data sent between ledger-capable node 104 and legacy node 108.

At step 350, in one embodiment, one or both nodes 104 and/or 108 may transmit a "nonce" (i.e., a secure random number) to "challenge" the other node to determine if the other node is actually who it claims to be. Nonces prevent replay attacks whereby an attacker observed a previous authentication exchange and simply re-uses the messages. By randomizing the data used in the exchange the recipient of a message can verify that the sender was in the possession of the private key at the time of sending. It should be understood that randomization of signed and/or encrypted data is a defense mechanism against replay attacks well known in the art, and may be utilized in any of the previously described exchanges between nodes.

At step 352, in order to limit the exposure of the registered, temporary operational certificate and its associated cryptographic keys, the registered, temporary operational certificate and its associated cryptographic keys may be deactivated so that communications using the cryptographic keys associated with the registered, temporary operational certificate will no longer be possible. In one embodiment, each registered, temporary operational certificate may comprise an expiration date, or expiration event, and once the expiration date or event has been reached, the registered, temporary operational certificate is becomes automatically invalid. The expiration date may be extremely short, in the order of seconds, minutes or hours, for example. The expiration time may be in the form of an absolute time, or as a relative duration after a predetermined event, such as the first use of the private key associated with the selected, temporary operational certificate. In another embodiment, a registered, temporary operational certificate may contain a constraint on the maximum number of times its private key may be used as an authentication credential. In another embodiment, once the useful life of legacy node 108 is completed, i.e., it has completed the mission, the registered, temporary operational certificate, and all of legacy node 108's unregistered, temporary operational certificates may become obsolete, and MSP node 102 may publish a cryptographic block identifying all certificate identifiers associated with legacy node 108 as revoked. In yet another embodiment, MSP node 102 may revoke node 104's membership in candidate channel 118.

In the description above, the embodiments may include a configuration in which MSP node 102 creates a dedicated AH CA certificate for each ledger-capable node 104, or for groups of ledger-capable nodes. This allows MSP node 102 to create different trust realms associated with particular operational certificates held by legacy node 108. Alternatively, MSP node 102 may assume the role of MSP on a multitude of permissioned candidate channels 118, each channel associated with a particular, registered, temporary operational certificate held by legacy node 108. The exact division of ledger-capable nodes into different AH CA realms or different candidate channels 118 depends on the specific security requirements of the mission, and it should be understood that above description is independent of the exact topology of permissioned channels and trust realms.

In the description above, certain aspects and embodiments of the invention may be applied independently and some of them may be applied in combination as would be apparent to those of skill in the art. For the purposes of explanation, specific details are set forth in order to provide a thorough understanding of embodiments of the invention.

The above description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the embodiments as set forth in the appended claims.

Although specific details are given to provide a thorough understanding of at least one embodiment, it will be understood by one of ordinary skill in the art that some of the embodiments may be practiced without disclosure of these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a method, a process or an algorithm performed by a processor, which may be depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. The terms "computer-readable medium", "memory", "storage medium", and "information storage device" includes, but is not limited to, portable or non-portable electronic information storage devices, optical storage devices, and various other mediums capable of storing, containing, or carrying instruction(s) and/or data. These terms each may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, RAM, ROM, flash memory, solid state disk drives (SSD), etc. A computer-readable medium or the like may have stored thereon code and/or processor-executable instructions that may represent a method, algorithm, procedure, function, subprogram, program, routine, subroutine, or any combination of instructions, data structures, or program statements.

Furthermore, embodiments may be implemented by hardware, software, firmware, middleware, microcode, hardware description languages, or any combination thereof. When implemented in software, firmware, middleware or microcode, the program code, i.e., "processor-executable code", or code symbols to perform the necessary tasks (e.g., a computer-program product) may be stored in a computer-readable or machine-readable medium. A processor(s) may perform the necessary tasks.

What is claimed is:

1. A method for managing trust relationships with legacy nodes in a network of ledger-capable nodes, comprising:

enrolling, by a mission control center, a plurality of ledger-capable nodes in a permissioned mission channel of a distributed ledger network, including a first ledger-capable node and a second ledger-capable node, to form a first trust relationship among the plurality of ledger-capable nodes based on a membership in the permissioned distributed ledger channel;

assigning the first ledger-capable node as a trust manager for a permissioned candidate channel of the distributed ledger network;

enrolling, by the first ledger-capable node, the second ledger-capable node into the permissioned candidate channel to form a second trust relationship between the first ledger-capable node and the second ledger-capable node based on each node's membership in the permissioned candidate channel;

establishing a third trust relationship between the first ledger-capable node and a first legacy node using public-key infrastructure; and establishing a fourth trust relationship between the second ledger-capable node and the first legacy node based on the second trust relationship between the first ledger-capable node and the first legacy node.

2. The method of claim 1, wherein establishing the fourth trust relationship between the second ledger-capable node and the first legacy node based on the third trust relationship between the first ledger-capable node and the first legacy node comprises:

receiving, by the first ledger-capable node, an unregistered, temporary operational certificate from the first legacy node, the unregistered, temporary operational certificate for authenticating the first legacy node to the second ledger-capable node, the unregistered, temporary operational certificate comprising a public key associated with the unregistered, temporary operational certificate;

providing, by the first ledger-capable node, an ad-hoc public key to the first legacy node;

counter-signing, by the first ledger-capable node, the unregistered, temporary operational certificate with an ad-hoc private key belonging to the first ledger-capable node to form a registered, temporary operational certificate;

providing the registered, temporary operational certificate to the second ledger-capable node; receiving, by the second ledger-capable node, a communication from the first legacy node, signed with a private key associated with the registered, temporary operational certificate; and verifying the first legacy node using the public key of the registered temporary operational certificate.

3. The method of claim 1, wherein establishing the third trust relationship between the second ledger-capable node and the first legacy node comprises:

determining a need to communicate with the legacy node;

selecting the second ledger-capable node to communicate with the legacy node as a member of the permissioned candidate channel;

providing a digital certificate and a registered, temporary operational certificate to the second ledger-capable node, each registered certificate signed by an ad-hoc private key of the first ledger-capable node; and mutually authenticating the second ledger-capable node and the legacy node using the digital certificate and the registered, temporary operational certificate.

4. The method of claim 3, further comprising:

publishing a cryptographically-signed digital certificate on the permissioned candidate channel, the cryptographically signed digital certificate comprising a public key of the first legacy node; and retrieving, by the first ledger-capable node, the public key for authenticating the legacy node.

5. The method of claim 1, wherein establishing the fourth trust relationship comprises:

providing, by the first legacy node to the first ledger-capable node, an unregistered, temporary operational certificate issued by a root certificate authority recognized as a trust authority of the first trust relationship, the registered, temporary operational certificate comprising a public cryptographic key associated with the registered, temporary operational certificate;

cryptographically counter-signing, by the first ledger-capable node, the registered, temporary operational certificate using an ad-hoc private cryptographic key of the first ledger-capable node, for producing a registered, temporary operational certificate;

providing the registered, temporary operational certificate to the second ledger-capable node;

receiving, by the second ledger-capable node, a communication from the legacy node, the communication cryptographically signed with a private cryptographic key associated with the registered, temporary operational certificate; and verifying, by the second ledger-capable node, that the communication was cryptographically signed by the legacy node using the private cryptographic key associated with the registered, temporary operational certificate.

6. The method of claim 1, wherein establishing the fourth trust relationship comprises:

providing, by the first ledger-capable node, a digital certificate and a registered, temporary operational certificate to the second ledger-capable node, each registered, certificate signed by an ad-hoc private key of the first ledger-capable node; and using, by the second ledger-capable node, the digital certificate to authenticate itself to the legacy node, and using a public key of the registered, temporary operational certificate to authenticate the legacy node.

7. The method of claim 1, wherein the fourth trust relationship is created at a time when communication with the first legacy node is desired.

8. The method of claim 1, wherein the fourth trust relationship is terminated after a communication between the second ledger-capable node and the first legacy node has concluded.

9. The method of claim 3, wherein selecting the second ledger-capable node to communicate with the legacy node comprises a determination that the second ledger-capable node is capable of communicating with the first legacy node.

10. The method of claim 3, wherein selecting the second ledger-capable node to communicate with the legacy node comprises a determination that the second ledger capable node is authorized to communicate with the first legacy node.

11. The method of claim 5, wherein the first ledger-capable node acts as a proxy certificate authority for the root certificate authority.

12. The method of claim 1, wherein establishing the third and fourth trust relationships comprises:

establishing the third trust relationship between the first legacy node and the first ledger-capable node using a first certificate issued to the first legacy node and a second certificate issued to the first ledger-capable node, each certificate issued by a root certificate authority; and establishing the fourth trust relationship between the first legacy node and the second ledger-capable node using a third certificate issued from the first ledger-capable node to the second ledger-capable node and a registered, temporary operational certificate issued to the second ledger-capable node comprising a public key associated with the registered, temporary operational certificate.

* * * * *